United States Patent
Wang et al.

(10) Patent No.: US 8,068,354 B2
(45) Date of Patent: Nov. 29, 2011

(54) CURRENT-LEVEL CONTROLLING DEVICE FOR A POWER SUPPLY DEVICE AND RELATED POWER SUPPLY DEVICE

(75) Inventors: Yen-Hui Wang, Hsinchu (TW); Chi-Hao Wu, Taipei (TW); Chia-Chieh Hung, Taoyuan County (TW); Chin-Yen Lin, Hsinchu County (TW)

(73) Assignee: Grenergy Opto, Inc., Hsinchu Science Park, Hsinchu (TW)

( * ) Notice: Subject to any disclaimer, the term of this patent is extended or adjusted under 35 U.S.C. 154(b) by 512 days.

(21) Appl. No.: 12/336,537

(22) Filed: Dec. 17, 2008

(65) Prior Publication Data
US 2009/0256545 A1 Oct. 15, 2009

Related U.S. Application Data

(60) Provisional application No. 61/044,908, filed on Apr. 15, 2008.

(51) Int. Cl.
*H02M 3/335* (2006.01)
(52) U.S. Cl. ..................... 363/21.09; 323/276
(58) Field of Classification Search ............... 363/17, 363/72, 79, 21.05, 21.09, 21.17; 323/222, 323/224, 235, 237, 242, 282, 285, 299, 313, 323/315, 316, 272, 276; 307/64, 66, 82; 320/107, 137, 140, 161; 327/20, 65, 110, 327/124
See application file for complete search history.

(56) References Cited

U.S. PATENT DOCUMENTS

| | | | |
|---|---|---|---|
| 4,326,245 A | 4/1982 | Saleh | |
| 5,408,192 A * | 4/1995 | Bailey | 327/254 |
| 5,745,351 A * | 4/1998 | Taurand | 363/20 |
| 5,903,452 A * | 5/1999 | Yang | 363/97 |
| 6,191,676 B1 * | 2/2001 | Gabor | 336/160 |
| 6,385,059 B1 * | 5/2002 | Telefus et al. | 363/21.15 |
| 7,573,252 B1 * | 8/2009 | Griesert | 323/315 |

FOREIGN PATENT DOCUMENTS

| | | |
|---|---|---|
| CN | 1246985 A | 3/2000 |
| JP | 611266 | 1/1986 |

OTHER PUBLICATIONS

JP 61-1266.*

* cited by examiner

*Primary Examiner* — Rajnikant Patel
(74) *Attorney, Agent, or Firm* — Winston Hsu; Scott Margo

(57) ABSTRACT

A current-level controlling device for a power supply includes a reception end for receiving a current sense signal, a reference voltage generator for generating a reference voltage, an adaptive reference voltage generator, coupled to the reference voltage generator and the reception end, for adjusting the reference voltage according to variation of peak values of the current sense signal, so as to generate an adaptive reference voltage, a comparator, coupled to the reception end and the adaptive reference voltage generator, for comparing the current sense signal and the adaptive reference voltage, to generate a comparison result, and a control unit, coupled to the comparator, for controlling a switch transistor of the power supply according to the comparison result.

6 Claims, 8 Drawing Sheets

CURRENT-LEVEL CONTROLLING DEVICE FOR A POWER SUPPLY DEVICE AND RELATED POWER SUPPLY DEVICE

CROSS REFERENCE TO RELATED APPLICATIONS

This application claims the benefit of U.S. Provisional Application No. 61/044,908, filed on Feb. 15, 2008 and entitled "Over Current Protection Circuit with Adaptive Reference in a Power Supply Device", the contents of which are incorporated herein by reference.

BACKGROUND OF THE INVENTION

1. Field of the Invention

The present invention is related to a current-level controlling device for a power supply and related power supply, and more particularly, to a current-level controlling device and related power supply capable of regulating a reference voltage based upon variation of a peak value of a current sense signal, to make an actual voltage for activating over-current protection equal to an expected voltage for activating the over-current protection, to greatly improve the problem of time delay and voltage drift of the protection point.

2. Description of the Prior Art

Power supply is used to provide an electrical power source for operating an electronic device. According to the circuit architecture, power supplies can be classified into two types, Linear and Switching. A switching power supply has benefits of small volume, light weight and high power efficiency, so it can be widely used in various kinds of electronic devices, such as mobile phone, PDA, computer and peripherals, server and network appliances.

For sustaining the normal operation of the power supply, the protection mechanism of a control circuit for protecting the power supply is a very critical part (for example, protection functions of over-voltage, over-current, and over-power), and once the overload or the short condition happens, a power supply with complete protection functions can prevent the internal components or related appliances from being damaged.

Please refer to FIG. 1, which illustrates a schematic diagram of a switching power supply 10 of the prior art. The switching power supply 10 comprises the over-current protection function, and is used to convert an input voltage signal VIN to an output voltage signal VOUT with a proper voltage level. The switching power supply 10 comprises a transformer 100, a control unit 102, a comparator 104, a switch transistor Q1 and a current sensing resistor Rs. The operations of the circuit are stated as follows. First, the current sensing resistor Rs generates the current sense signal VCS based upon the primary winding current Id. Second, the comparator 104 compares the current sense signal VCS and a reference voltage VREF, and outputs an indication signal SOC to the control unit 102, such that the control unit 102 can determine whether it has fallen into the range of current protection. For example, when the current sense signal VCS is higher than the reference voltage VREF, the comparator 104 can indicate an over-current condition happens via the indication signal SOC, the control unit 102 can turn off the switch transistor Q1 to reduce current in the primary winding.

Simply speaking, the protection mechanism mentioned above is to compare the current sense signal VCS and the reference voltage VREF, such that the primary winding current Id can be controlled within a proper range for the purpose of protection. However, when the current sense signal VCS is higher than the reference signal VREF, the switch transistor Q1 cannot be turned off immediately owing to some non-ideal factors, and it will take an interval of time for the control unit 102 to turn off the switch transistor Q1. That is to say, there exists a time delay T_D, starting from the moment for the over-current condition being detected to the time for the switch transistor Q1 being turned off, and the current level right before being turned off will surpass the pre-defined level by a specific amount. In other words, the voltage level right before the over-current protection starts (abbreviated as "protection point voltage" hereafter) will be larger than the voltage level when the over-current condition is taking place. For different levels of the input voltage VIN, the voltage level of the protection point voltage varies accordingly.

For more details, please refer to FIG. 2, which illustrates the voltage difference of the protection point voltage for different input voltages within the same time delay. The input voltage VIN of the switching power supply 10 is proportional to the slope of the current sense signal VCS. Therefore, with the same reference voltage VREF, a higher input voltage VH will generate a current sense signal VCS of bigger slope, and a lower input voltage VL will generate a current sense signal VCS of smaller slope. Note that, a power supply always has the same time delay T_D since the time delay T_D is independent of the level of the input voltage VIN. As illustrated in FIG. 2, when the current sense signal VCS rises to the power limiting level corresponding to the reference voltage VREF, or the current sense signal VCS is greater than or equal to the reference voltage VREF, the comparator 104 transmits the indication signal SOC to the control unit 102, such that the switch transistor Q1 can be turned off. Since the circuit coming with the non-ideal factor, therefore, after the transmission delay T_D, the switch transistor Q1 starts being turned off, and the primary winding current Id can then be cut off. From the moment of the over-current condition being detected to the switch transistor Q1 being turned off, the input voltage VIN will continue to transfer power, such that the protection point voltage becomes VOPPH for the high input voltage VH, or the protection point voltage becomes VOPPL for the low input voltage VL. In other words, the protection point voltage will be higher than the reference voltage VREF, and as the input voltage VIN gets higher, the situation becomes even more obvious. Under this situation, when the input voltage VIN varies in a wide range, the protection point voltage will drift seriously, such that the output power levels corresponding to the high and the low input voltages differs a lot.

SUMMARY OF THE INVENTION

It is therefore a primary objective of the claimed invention to provide a current-level controlling device for a power supply and the related power supply.

The present invention discloses a current-level controlling device for a power supply, which comprises a reception end for receiving a current sense signal, a reference voltage generator for generating a reference voltage, an adaptive reference voltage generator, coupled to the reference voltage generator and the reception end, for adjusting the reference voltage according to variation of peak values of the current sense signal, so as to generate an adaptive reference voltage, a comparator, coupled to the reception end and the adaptive reference voltage generator, for comparing the current sense signal and the adaptive reference voltage, to generate a comparison result, and a control unit, coupled to the comparator, for controlling a switch transistor of the power supply according to the comparison result.

The present invention also discloses a power supply capable of preventing an over-current damage, which comprises a transformer, comprising a primary winding circuit and a secondary winding circuit, a switch transistor, coupled to the secondary winding circuit, a current sensing unit, coupled to the switch transistor, for generating a current sense signal according to current flowing through the switch transistor in the primary winding circuit, and a current-level controlling device, coupled to the current sensing unit and the switch transistor, which further comprises a reception end for receiving a current sense signal, a reference voltage generator for generating a reference voltage, an adaptive reference voltage generator, coupled to the reference voltage generator and the reception end, for adjusting the reference voltage according to variation of peak values of the current sense signal, so as to generate an adaptive reference voltage, a comparator, coupled to the reception end and the adaptive reference voltage generator, for comparing the current sense signal and the adaptive reference voltage, to generate a comparison result, and a control unit coupled to the comparator for controlling a switch transistor of the power supply according to the comparison result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
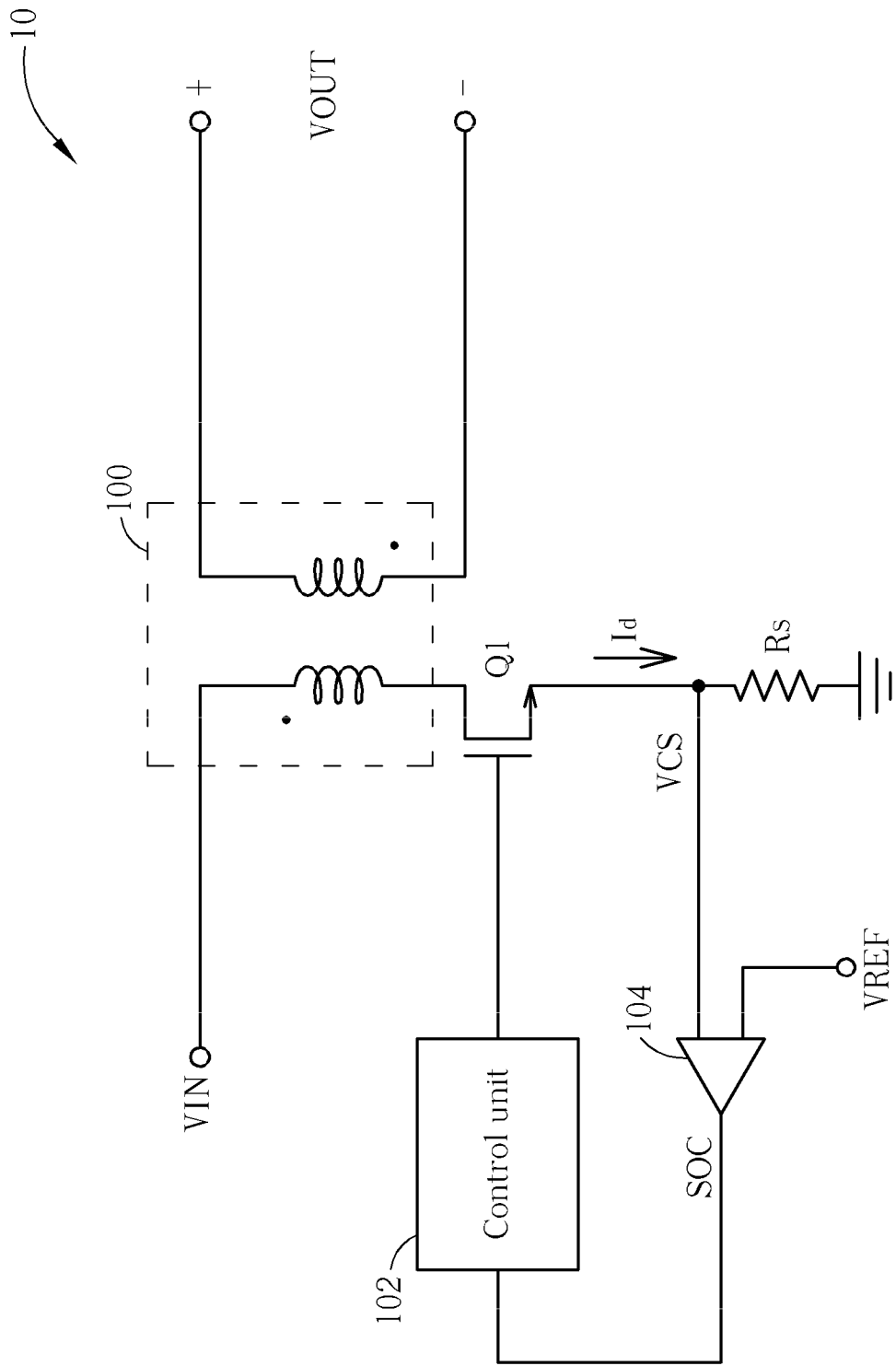
FIG. 1 illustrates a schematic diagram of a switching power supply of the prior art.
Figure 2:
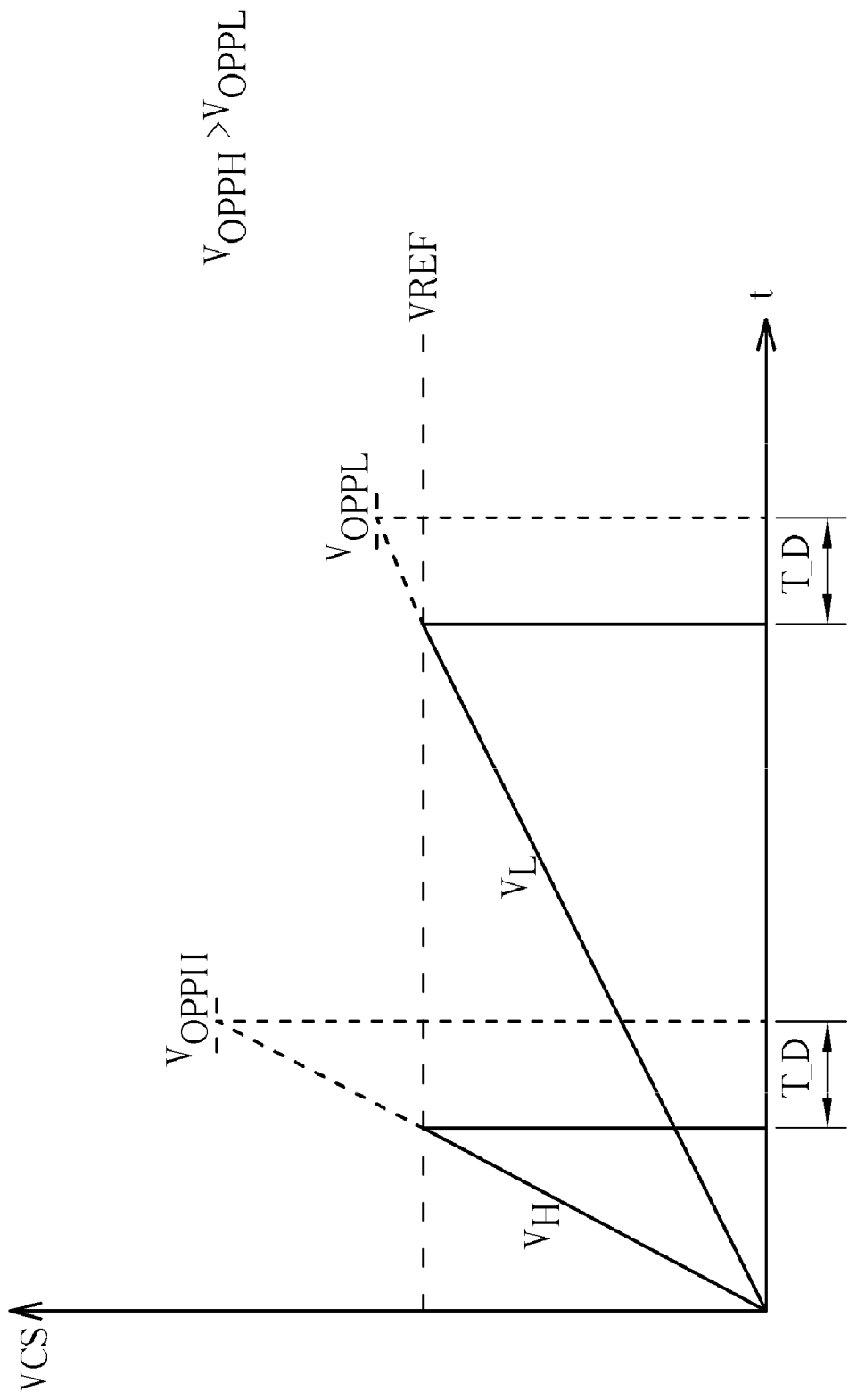
FIG. 2 illustrates the voltage difference of the protection point voltages for different input voltages within the same time delay.
Figure 3:
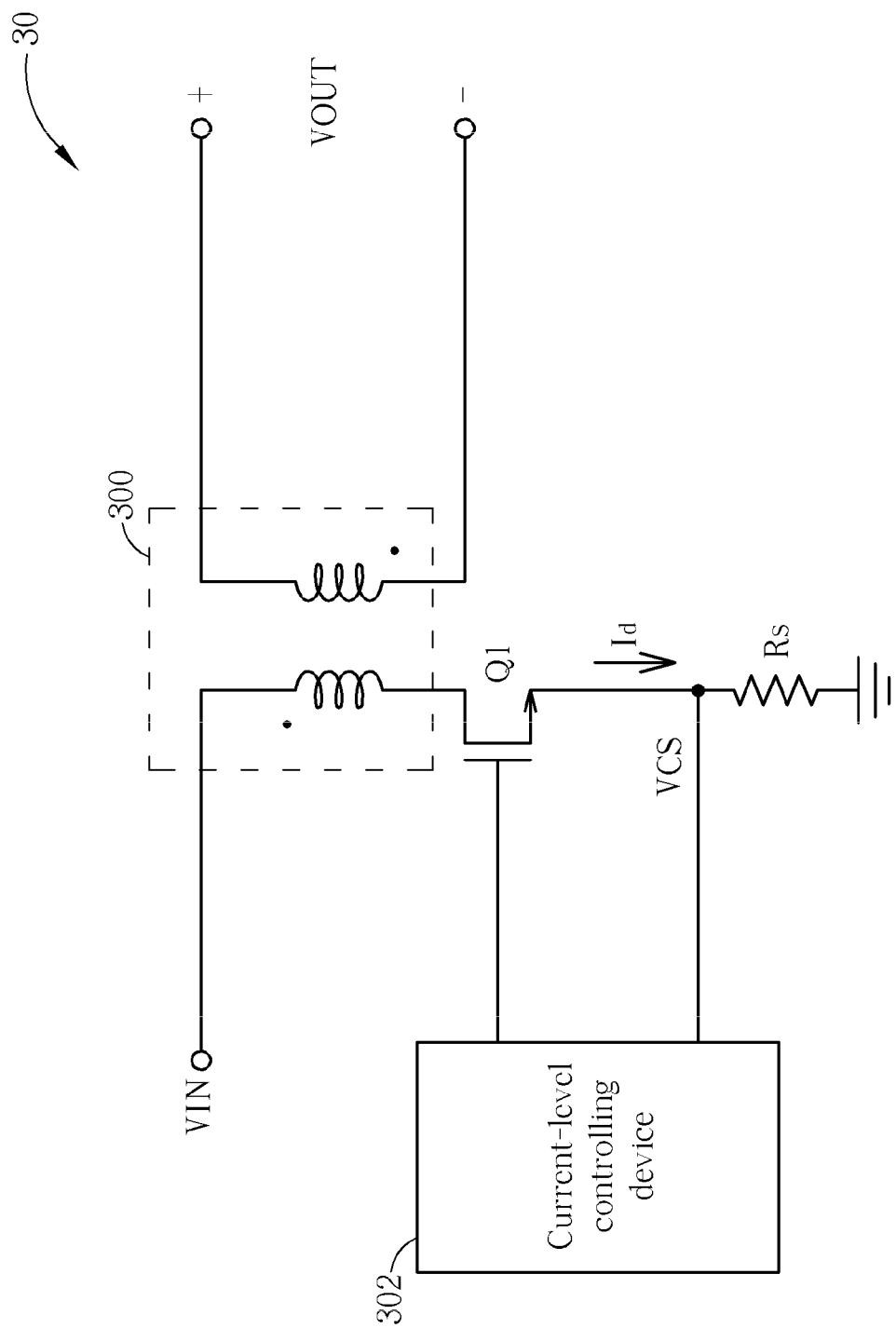
FIG. 3 is a schematic diagram of a power supply in accordance with an embodiment of the present invention.

Please refer to FIG. 3, which is a schematic diagram of a power supply 30 in accordance with an embodiment of the present invention. Preferably, the power supply 30 is a switching power supply, and comprises a transformer 300, a switch transistor Q1, a current sensing resistor Rs and a current-level controlling device 302. The transformer 300, composed of a primary winding circuit and a secondary winding circuit, is used for transforming the input voltage signal VIN to an output voltage signal VOUT. The switch transistor Q1, coupled to the primary winding of the transformer 300, is used for the switching the operations of the transformer 300. The current sensing resistor Rs, coupled to the switch transistor Q1 and used as a current sensing element, generates a current sense signal VCS based upon the primary winding current Id flowing through the switch transistor Q1. The current-level controlling device 302, coupled to the switch transistor Q1 and the current sensing resistor Rs, is used for monitoring the primary winding current Id to be operated within a protected range. Once the current Id operates outside the protected range, the switch transistor Q1 will be turned off to reach the goal of over-current protection.

Figure 4:
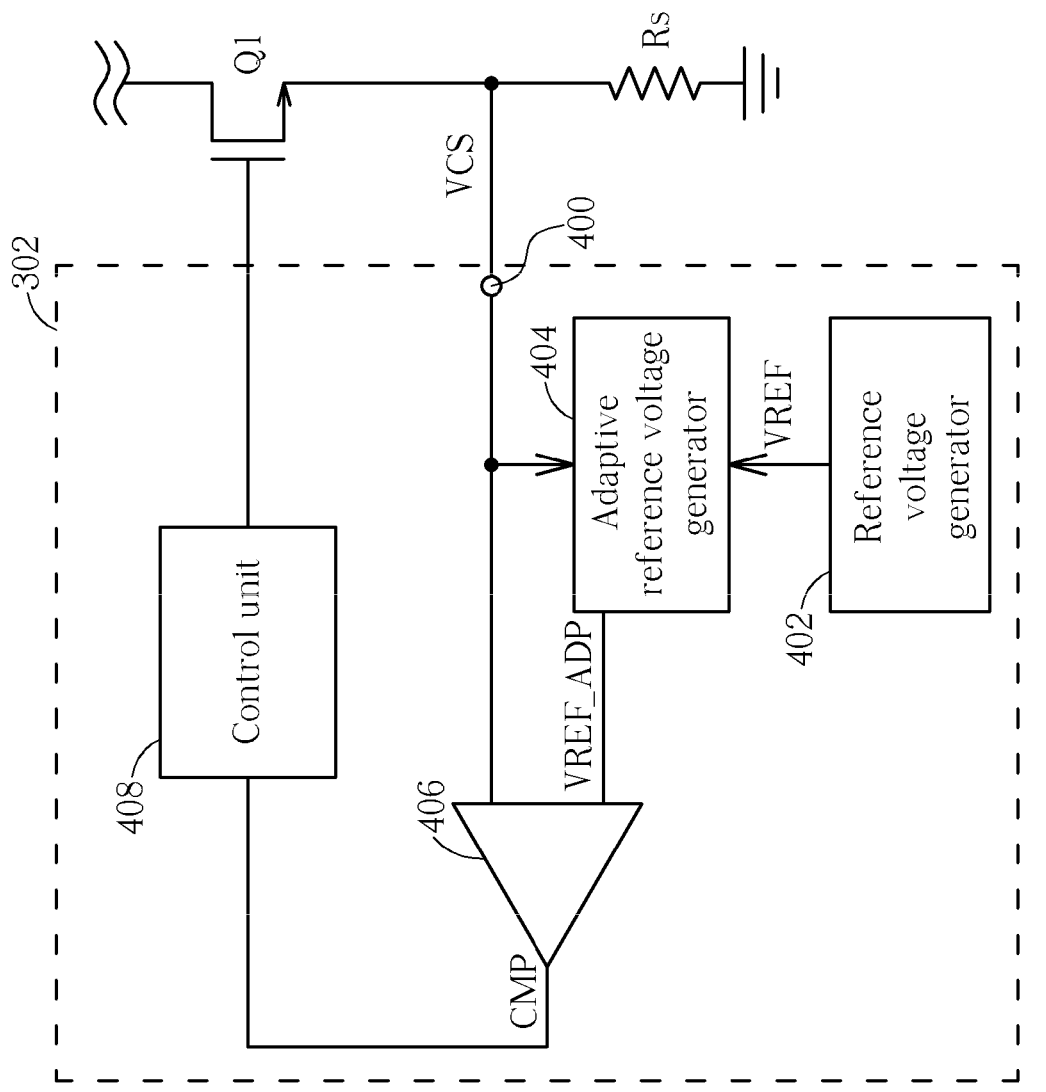
FIG. 4 is a schematic diagram of a current-level controlling device as shown in FIG. 3.

Please refer to FIG. 4, which is a schematic diagram of the current-level controlling device 302 as shown in FIG. 3. The current-level controlling device 302 comprises a reception end 400, a reference voltage generator 402, an adaptive reference voltage generator 404, a comparator 406 and a control unit 408. The reception end 400, coupled to the current sensing resistor Rs, is used for receiving the current sense signal VCS, such that the current sense signal VCS is transferred to the adaptive reference voltage generator 404 and the comparator 406. The reference voltage generator 402, coupled to the adaptive reference voltage generator 404, is used for generating a reference voltage VREF. The adaptive reference voltage generator 404 can receive the current sense signal VCS and the reference voltage VREF, and adjusts the reference voltage VREF according to variation of peak values of the current sense signal VCS, so as to generate an adaptive reference voltage VREF_ADP. Furthermore, the comparator 404 compares the current sense signal VCS and the adaptive reference voltage VREF_ADP to generate a comparison result CMP and output to the control unit 408. The control unit 408 controls the conduction status of the switch transistor Q1. Simply speaking, the current-level controlling device 302 can adjust the reference voltage VREF according to variation of peak values of the current sense signal VCS, such that the adaptive reference voltage VREF_ADP can meet the demands of different system requirements. Please refer to the following description for more details of operation.

Figures 5A, 5B, 5C:
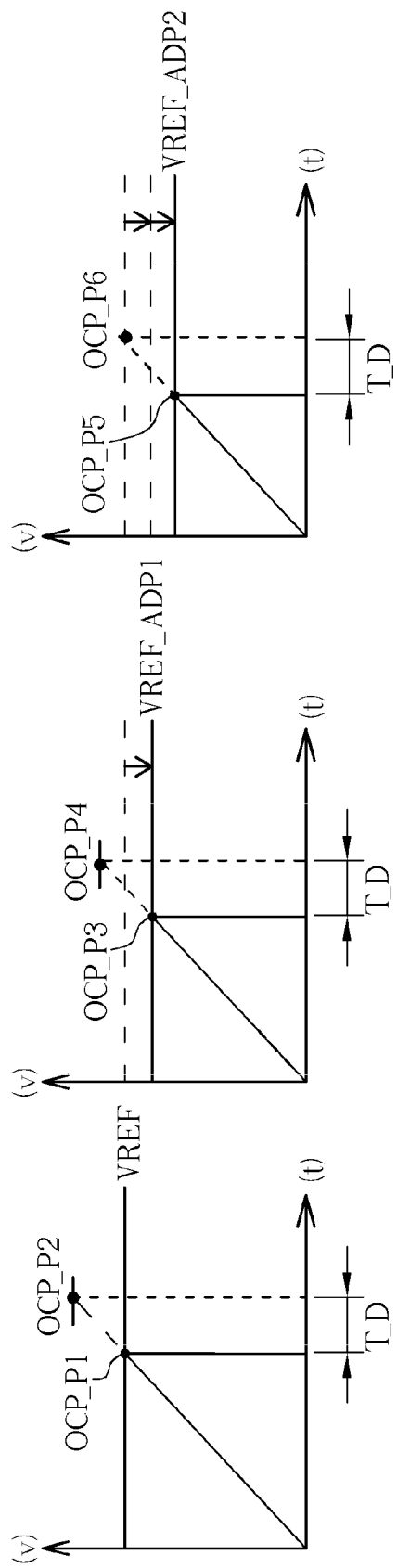
FIG. 5A to 5C are schematic diagrams of operations of the current-level controlling device shown in FIG. 4.

Please refer to FIG. 5A to 5C, which are schematic diagrams of the operations of the current-level controlling device 302 shown in FIG. 4. First, as depicted in FIG. 5A, when the current-level controlling device 302 starts operating, the adaptive reference voltage VREF_ADP is equal to the reference voltage VREF (only the reference voltage VREF is shown on the figure). When the current sense signal VCS reaches the reference voltage VREF, the control unit 408 can determine the happening of over-current and turn the transistor Q1 off. However, owing to the existence of some non-ideal factors in the circuit, the switch transistor Q1 cannot be turned off instantaneously, and only can the control unit 408 be turned off after a time delay T_D. Therefore, the actual voltage for activating the over-current protection OCP_P2 will be higher than the expected voltage OCP_P1. Moreover, in FIG. 5B, since the peak value of the current sense signal VCS is higher than the reference voltage VREF, the adaptive reference voltage generator 404 lessens the reference voltage VREF to a lower level of the adaptive reference voltage VREF_ADP1. Under this condition, the voltage threshold used for detecting the over-current OCP_P3 decreases, such that the voltage for activating the over-current protection OCP_P4 also decreases, but OCP_P4 is still higher than OCP_P1. By following the same procedure, eventually, as shown in FIG. 5C, the adaptive reference voltage generator 404 will decrease the reference voltage VREF to an adaptive reference voltage VREF_ADP2 to decrease the voltage for detecting the over-current OCP_P3, and to make the actual voltage for activating the over-current protection OCP_P4 equal to the expected voltage for activating the over-current protection. In other words, via detecting the variation of the peak value of the current sense signal VCS, the adaptive reference voltage generator 404 can fine tune the reference voltage VREF to the desired adaptive reference voltage VREF_ADP, such that the actual voltage for activating the over-current protection OCP_P4 is equal to the expected voltage for activating the over-current protection. Therefore, the issue induced by the time delay can be solved, and more importantly, the current level controlling device 302 can adaptively adjusting the reference voltage by meeting various system requirements for preventing the voltage drifting problem associated with the protection points.

Figure 6:
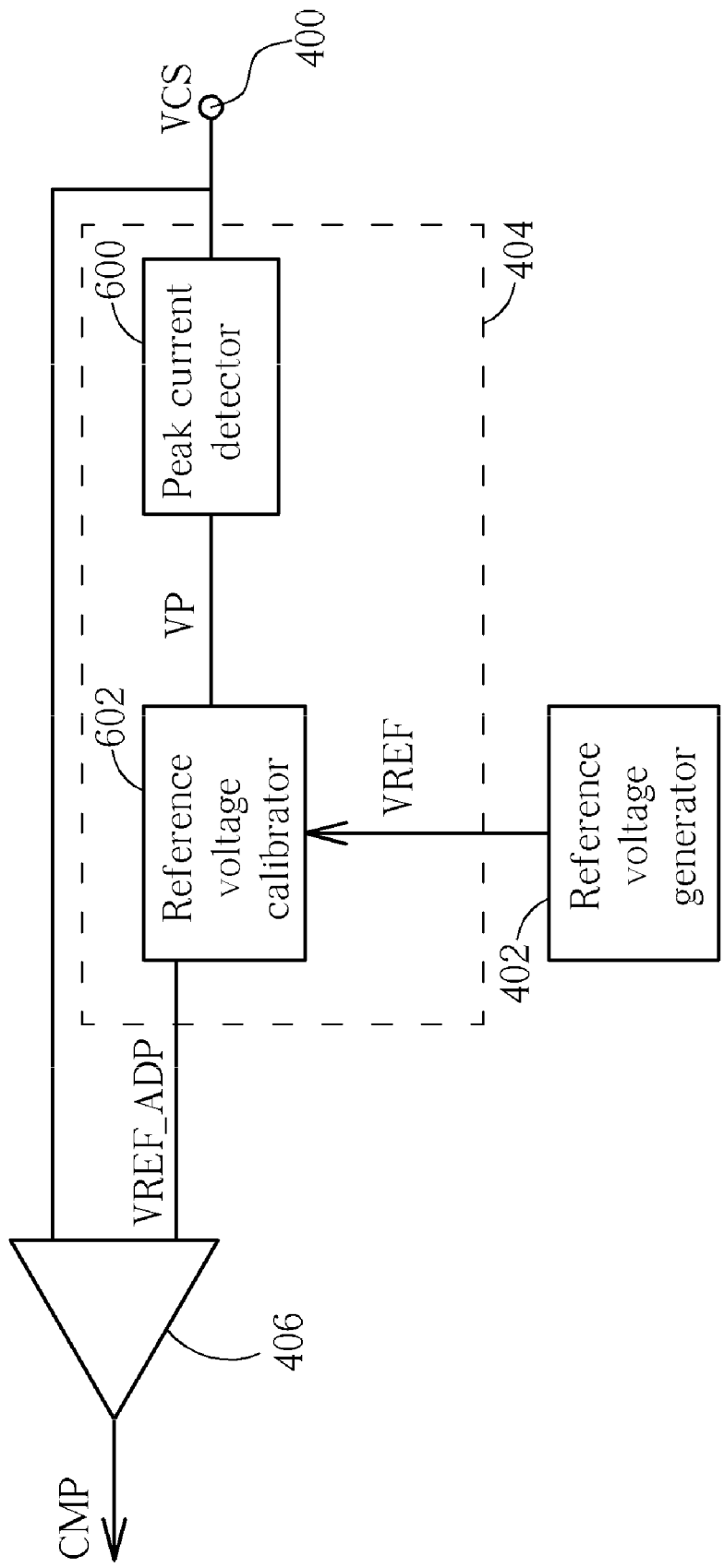
FIG. 6 illustrates an embodiment of the adaptive reference voltage generator according to FIG. 4.
Figure 7:
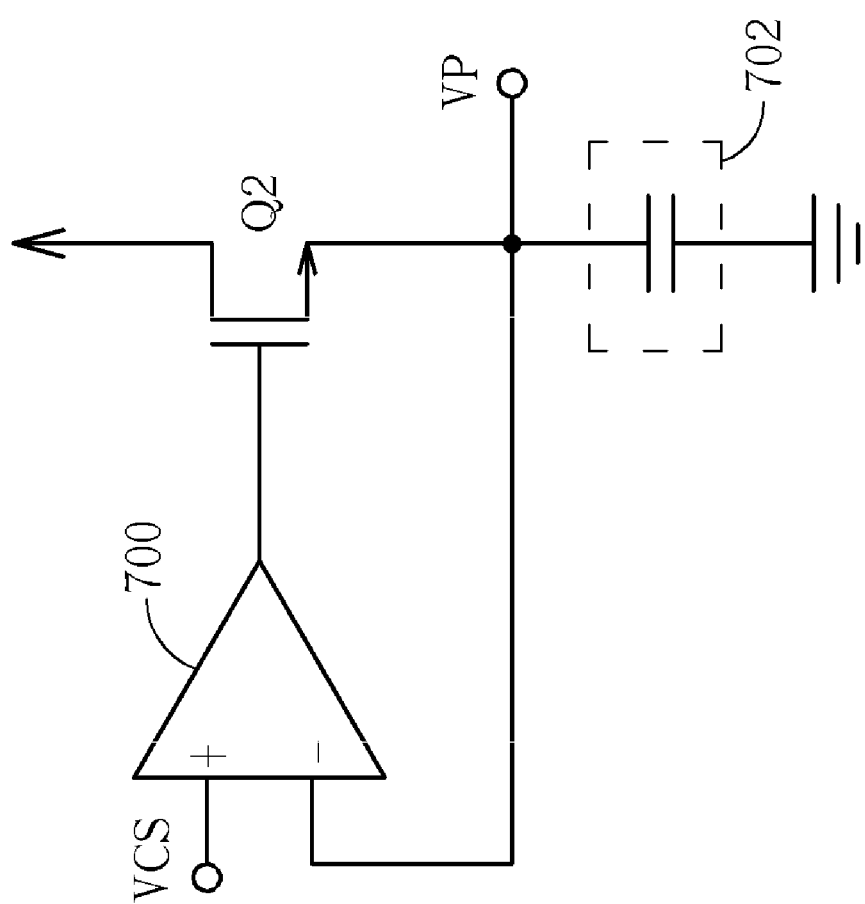
FIG. 7 is a schematic diagram illustrating the peak current detector shown in FIG. 6.
Figure 8:
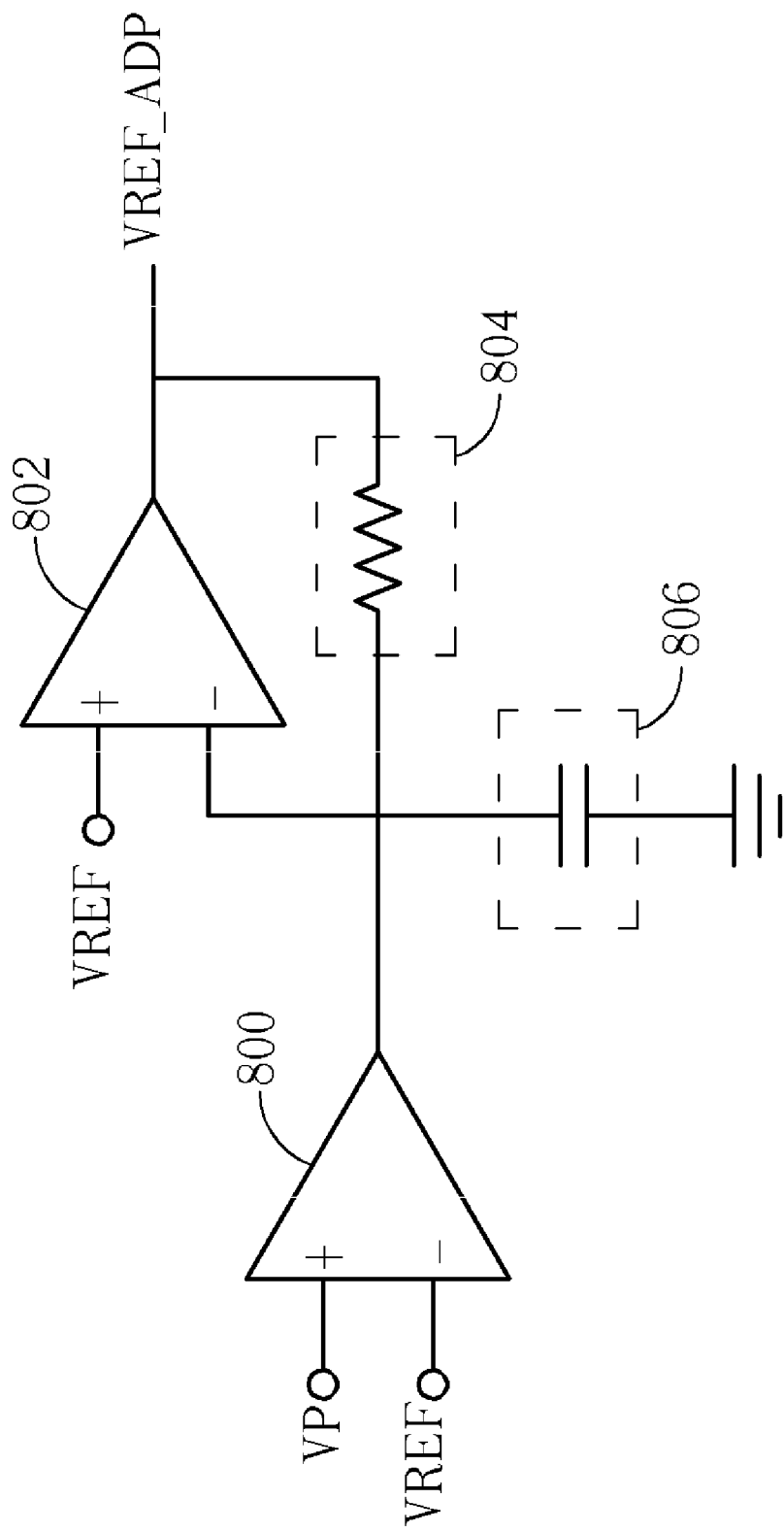
FIG. 8 is a schematic diagram illustrating the reference voltage calibrator depicted in FIG. 6.

Therefore, via the current-level controlling device 302, the power supply 30 can adaptively adjust the reference voltage to solve the problem of the time delay, and prevent the problem of the protection point voltage drift. Noticeably, FIG. 3 and FIG. 4 exhibit embodiments of the present invention, and those skilled in the art can make numerous modifications and alterations accordingly. For example, please refer to FIG. 6, which illustrates an embodiment of the adaptive reference voltage generator 404 shown in FIG. 4. As shown in FIG. 6, the adaptive reference voltage generator 404 comprises a peak current detector 600 and a reference voltage calibrator 602. The peak current detector 600, coupled to the reception end, detects variation of the peak values of the current sense signal VCS and outputs a peak value detecting result VP. The reference voltage calibrator 602, coupled to the peak current detector 600, the reference voltage generator 402 and the comparator 406, for outputting the adaptive reference voltage VREF_ADP to the comparator 406. Please continue to refer to FIG. 7 and FIG. 8. FIG. 7 is a schematic diagram illustrating the peak current detector 600 shown in FIG. 6. FIG. 8 is a schematic diagram illustrating the reference voltage calibrator 602 depicted in FIG. 6. The peak current detector 600 comprises a transistor Q2, an operational amplifier 700 and a capacitor 702. Preferably, the transistor Q2 is an n-type metal-dioxide transistor (NMOS), and is controlled by the output of the operational amplifier 700. The positive end of the operational amplifier 700 is coupled to the reception end 400, and the negative end is coupled between the source of the transistor Q2 and the capacitor 702, such that a negative feedback structure is established to output the peak value detection result VP in proper time based on the variations of the peak value of the current sense signal VCS. The reference voltage calibrator 602 comprises an error amplifier 800, an operational amplifier 802, a resistor 804 and a capacitor 806. The error amplifier 800 is used for comparing and amplifying the difference between the peak value detecting result VP and the reference voltage VREF, and outputting the adaptive reference voltage VREF_ADP via the operational amplifier 802, the resistor 804 and the capacitor 806.

To sum up, the present invention regulates the reference voltage based upon the variations of the peak value of the current sense signal, such that the actual voltage for activating the over-current protection is identical to the expected voltage for activating the over-current protection, meanwhile, the problems of time delay and the drift of the protection point voltage can be greatly improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A current-level controlling device for a power supply comprising:
   a reception end for receiving a current sense signal;
   a reference voltage generator for generating a reference voltage;
   an adaptive reference voltage generator, coupled to the reference voltage generator and the reception end, for adjusting the reference voltage according to variation of peak values of the current sense signal, so as to generate an adaptive reference voltage, comprising:
      a peak current detector, coupled to the reception end, for detecting variation of the peak values of the current sense signal, comprising:
         a transistor, comprising a first end coupled to a voltage source, a second end and a third end, for conducting a signal connection between the first end and the third end according to signals received by the second end;
         an operational amplifier, comprising a first input end coupled to the reception end, a second input end coupled to the third end of the transistor, and an output end coupled to the second end of the transistor; and
         a capacitor, having one end coupled between the third end of the transistor and the second input end of the operational amplifier, and the other end coupled to a ground; and
      a reference voltage calibrator, coupled to the peak current detector, the reference voltage generator and the comparator, for outputting the adaptive reference voltage to the comparator;
   a comparator, coupled to the reception end and the adaptive reference voltage generator, for comparing the current sense signal and the adaptive reference voltage, to generate a comparison result; and
   a control unit, coupled to the comparator, for controlling a switch transistor of the power supply according to the comparison result.

2. The current-level controlling device of claim 1, wherein the transistor is an n-type metal oxide semiconductor field effect transistor, the first end is a drain, the second end is a gate, and the third end is a source.

3. The current-level controlling device of claim 1, wherein the peak current detector comprises:
   an error amplifier, comprising a first input end coupled to the peak current detector, a second end coupled to the reference voltage generator, and an output end;
   an operational amplifier, comprising a first input end coupled to the reference voltage generator, a second end coupled to the output end of the error amplifier, and an output end coupled to the comparator;
   a resistor, having one end coupled between the comparator and the second end of the operational amplifier, and the other end coupled between the second input end of the operational amplifier and the output end of the error amplifier; and
   a capacitor, having one end coupled between the second end of the operational amplifier and the output end of the error amplifier, and the other end coupled to a ground.

4. A power supply capable of preventing an over-current damage comprising:
   a transformer, comprising a primary winding circuit and a secondary winding circuit;
   a switch transistor, coupled to the primary winding circuit;
   a current sensing unit, coupled to the switch transistor, for generating a current sense signal according to current flowing through the switch transistor in the primary winding circuit; and
   a current-level controlling device, coupled to the current sensing unit and the switch transistor, comprising:
      a reception end for receiving a current sense signal;
      a reference voltage generator for generating a reference voltage;
      an adaptive reference voltage generator, coupled to the reference voltage generator and the reception end, for adjusting the reference voltage according to variation of peak values of the current sense signal, so as to generate an adaptive reference voltage, comprising:

a peak current detector, coupled to the reception end, for detecting variation of the peak values of the current sense signal, comprising:

a transistor, comprising a first end coupled to a voltage source, a second end and a third end, for conducting a signal connection between the first end and the third end according to signals received by the second end;

an operational amplifier, comprising a first input end coupled to the reception end, a second input end coupled to the third end of the transistor, and an output end coupled to the second end of the transistor; and a capacitor, having one end coupled between the third end of the transistor and the second input end of the operational amplifier, and the other end coupled to a ground; and a reference voltage calibrator, coupled to the peak current detector, the reference voltage generator and the comparator, for outputting the adaptive reference voltage to the comparator;

a comparator, coupled to the reception end and the adaptive reference voltage generator, for comparing the current sense signal and the adaptive reference voltage, to generate a comparison result; and a control unit coupled to the comparator for controlling a switch transistor of the power supply according to the comparison result.

5. The power supply of claim 4, wherein the transistor is an n-type metal oxide semiconductor field effect transistor, the first end is a drain, the second end is a gate, and the third end is a source.

6. The power supply of claim 4, wherein the reference voltage calibrator comprises:

an error amplifier, comprising a first input end coupled to the peak current detector, a second end coupled to the reference voltage generator, and an output end;

an operational amplifier, comprising a first input end coupled to the reference voltage generator, a second end coupled to the output end of the error amplifier, and an output end coupled to the comparator;

a resistor, having one end coupled between the comparator and the second end of the operational amplifier, and the other end coupled between the second input end of the operational amplifier and the output end of the error amplifier; and a capacitor, having one end coupled between the second end of the operational amplifier and the output end of the error amplifier, and the other end coupled to a ground.

* * * * *